US010620742B2

(12) United States Patent
Han et al.

(10) Patent No.: US 10,620,742 B2
(45) Date of Patent: Apr. 14, 2020

(54) SWITCHABLE INPUT MODES FOR EXTERNAL DISPLAY OPERATION

(71) Applicant: Intel Corporation, Santa Clara, CA (US)

(72) Inventors: Xu Han, Shanghai (CN); Weiwei Zhu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/695,767

(22) Filed: Sep. 5, 2017

(65) Prior Publication Data
US 2018/0196571 A1 Jul. 12, 2018

Related U.S. Application Data

(63) Continuation of application No. 14/412,186, filed as application No. PCT/CN2014/074007 on Mar. 25, 2014, now Pat. No. 9,753,569.

(51) Int. Cl.
*G06F 3/041* (2006.01)
*G06F 3/038* (2013.01)
(Continued)

(52) U.S. Cl.
CPC .............. *G06F 3/0416* (2013.01); *G06F 3/02* (2013.01); *G06F 3/033* (2013.01); *G06F 3/038* (2013.01);
(Continued)

(58) Field of Classification Search
CPC .......... G06F 1/1632; G06F 3/02; G06F 3/033; G06F 3/038; G06F 3/0412; G06F 3/0416; G06F 3/044
See application file for complete search history.

(56) References Cited

U.S. PATENT DOCUMENTS 7,199,787 B2 * 4/2007 Lee .................. G06F 3/038
345/1.1
8,269,719 B1 * 9/2012 Kim .................. G06F 3/04895
345/156
(Continued)

FOREIGN PATENT DOCUMENTS

CN 102333152 1/2012
CN 103345312 10/2013

OTHER PUBLICATIONS

Zhang Zan, Translation of CN 103345312, Oct. 9, 2013.*
(Continued)

*Primary Examiner* — Dmitriy Bolotin
(74) *Attorney, Agent, or Firm* — Hanley, Flight & Zimmerman, LLC

(57) ABSTRACT

Embodiments are generally directed to switchable input modes for external display operation. An embodiment of an electronic device includes a touchscreen display; a processor; a connection for an external monitor; and a switch button. The electronic device includes a switchable input state including a first input mode for which the touchscreen display operates as a touchscreen input and a second input mode for which the touchscreen display operates as an input device for the operation of the external monitor, and the processor is to change operation of the electronic device to the first input mode or to the second input mode based upon a selection of input mode received from a user using the switch button.

26 Claims, 9 Drawing Sheets

(51) Int. Cl.
*G06F 3/033* (2013.01)
*G06F 3/02* (2006.01)
*G06F 3/044* (2006.01)
*G06F 1/16* (2006.01)

(52) U.S. Cl.
CPC ............ *G06F 3/044* (2013.01); *G06F 3/0412* (2013.01); *G06F 1/1632* (2013.01)

(56) References Cited

U.S. PATENT DOCUMENTS

| | | | | |
|---|---|---|---|---|
| 8,363,009 | B1* | 1/2013 | Queru | G06F 3/04883 345/1.2 |
| 9,514,306 | B2* | 12/2016 | Lee | G06F 21/60 |
| 9,753,569 | B2 | 9/2017 | Han et al. | |
| 2003/0025678 | A1* | 2/2003 | Lee | G06F 3/038 345/173 |
| 2004/0004603 | A1* | 1/2004 | Gerstner | G06F 1/1626 345/169 |
| 2010/0060572 | A1* | 3/2010 | Tsern | G06F 3/1415 345/157 |
| 2010/0064228 | A1* | 3/2010 | Tsern | G06F 3/1415 715/740 |
| 2010/0251243 | A1* | 9/2010 | Gill | G06F 1/1632 718/100 |
| 2011/0275391 | A1* | 11/2011 | Lee | H04M 1/7253 455/500 |
| 2012/0089946 | A1* | 4/2012 | Fukui | G08C 17/00 715/822 |
| 2013/0141374 | A1* | 6/2013 | Woolley | G06F 3/041 345/173 |
| 2013/0232437 | A1* | 9/2013 | Kim | G06F 3/0231 715/773 |
| 2013/0279106 | A1* | 10/2013 | Ergun | G06F 1/1607 361/679.26 |
| 2014/0035851 | A1* | 2/2014 | Kim | G06F 3/041 345/173 |
| 2015/0241025 | A1* | 8/2015 | Steiner | F21V 9/40 362/23.05 |
| 2016/0216829 | A1* | 7/2016 | Lin | G06F 3/0488 |

OTHER PUBLICATIONS

Taiwanese Patent Office, "Office Action," issued in connection with TW Patent Application No. 104105073, dated Nov. 9, 2017, 6 pages.
International Bureau, "International Preliminary Report on Patentability," issued in connection with PCT Application No. PCT/CN2014/074007, dated Sep. 27, 2016, 6 pages.
International Searching Authority, "International Search Report and Written Opinion," issued in connection with PCT Application No. PCT/CN2014/074007, dated Nov. 28, 2014, 13 pages.
Taiwanese Patent Office, "Notice of Allowance," issued in connection with TW Patent Application No. 104105073, dated Feb. 8, 2018, 2 pages.
United States Patent and Trademark Office, "Non-Final Office action," issued in connection with U.S. Appl. No. 14/412,186, dated Jan. 13, 2017, 14 pages.
United States Patent and Trademark Office, "Notice of Allowance," issued in connection with U.S. Appl. No. 14/412,186, dated May 5, 2017, 5 pages.
Zhang Fan, "System and method with intelligent terminal as host, mouse and touch panel at the same time," English Patent Translation of Chinese Patent No. CN103345312, dated Oct. 9, 2013, retrieved from https://patentscope.wipo.int/search/en/detail.jsf?docId=CN92115883&recNum=1&maxRec=&office=&prevFilter=&sortOption=&queryString=&tab=PCTDescription using "WIPO Translate" on Sep. 17, 2018, 3 pages.

\* cited by examiner

SWITCHABLE INPUT MODES FOR EXTERNAL DISPLAY OPERATION

CROSS-REFERENCE TO RELATED APPLICATIONS

This patent arises from a continuation of U.S. patent application Ser. No. 14/412,186, which was filed on Dec. 30, 2014, was entitled "SWITCHABLE INPUT MODES FOR EXTERNAL DISPLAY OPERATION," and was a U.S. National Phase of International Patent Application No. PCT/CN2014/074007, which was filed on Mar. 25, 2014. Priority to U.S. patent application Ser. No. 14/412,186 and PCT Application No. PCT/CN2014/074007 is hereby claimed. U.S. patent application Ser. No. 14/412,186 and PCT Application No. PCT/CN2014/074007 are hereby incorporated by reference in their entireties.

TECHNICAL FIELD

Embodiments described herein generally relate to the field of electronic devices and, more particularly, switchable input modes for external display operation.

BACKGROUND

Mobile devices with computing capability, such as 2-in-1 computers, convertible computers, tablet computers, and other similar devices, often support the use of an external display. The use of an external display allows a user of a mobile device to use the device for operations that are better served with a larger monitor, including operations involving work on documents and presentations for multiple persons.

However, the user of an external monitor generally requires the use of different input functions. External displays commonly are not touchscreens because of the cost of touchscreen technology at larger dimensions and other factors. Because of the lack of touchscreen capability, a user is generally required to connect a user interface device to the mobile device for external display operation, such as connecting a mouse, track pad, or other similar device to the mobile device to provide control functions on the external display.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Figure 1:
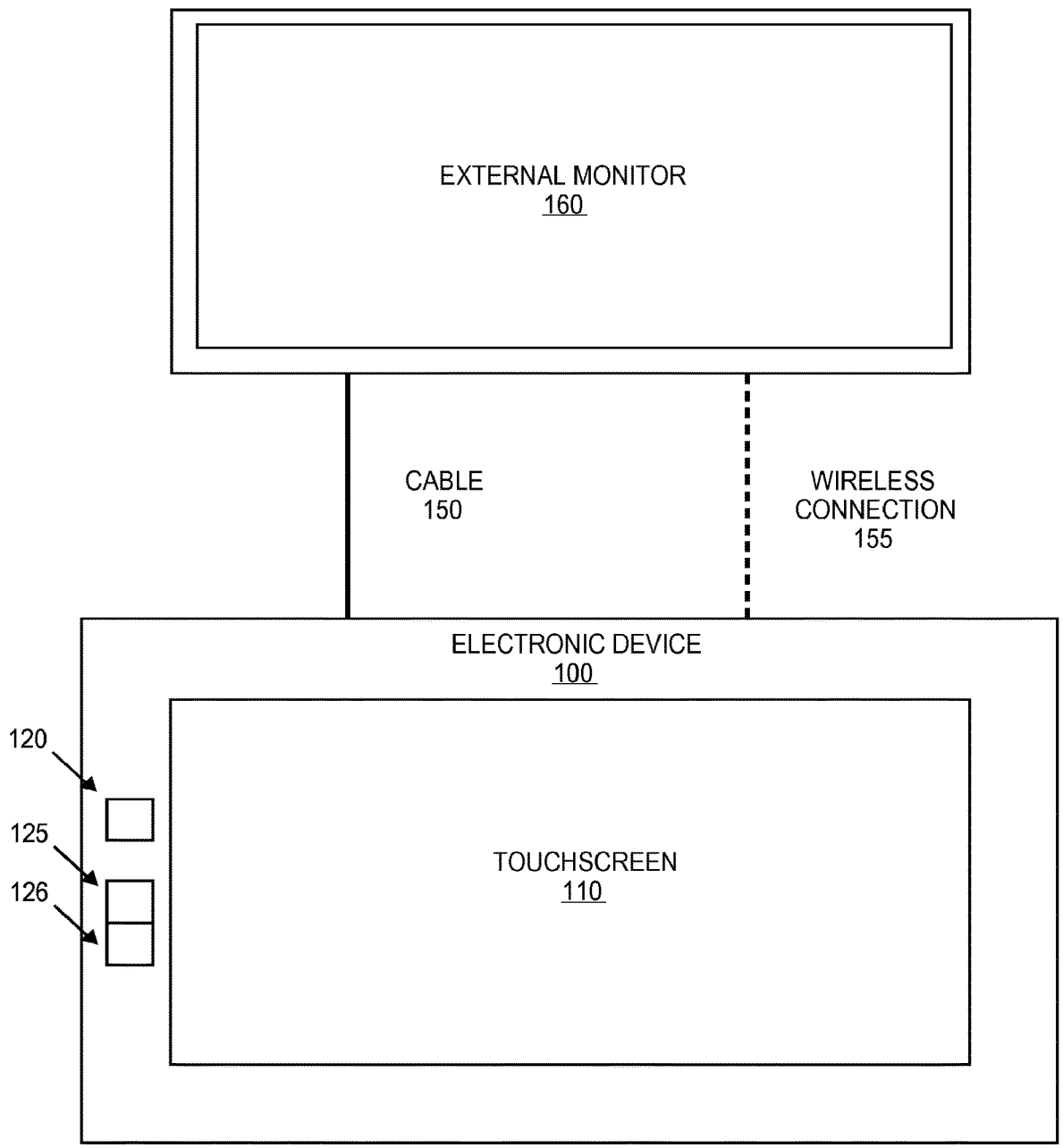
FIG. 1 is an illustration of an embodiment of an electronic device to provide switchable input modes for external display operation.

Embodiments described herein are generally directed to switchable input modes for external display operation.

For the purposes of this description:

"Mobile device" means a 2-in-1 or convertible computer (a laptop/tablet hybrid), detachable computer (laptop with detachable keyboard), tablet computer, smartphone, handheld computer, mobile Internet device, or other mobile apparatus that includes processing capability.

"External monitor" means an apparatus including a display screen that is connectable with an electronic device to provide a display for the electronic device.

"Touchscreen" means an electronic visual display for an electronic device that includes both display capability and touch sensitivity. A touchscreen commonly allows input of data or commands by a user through contact or proximity (generally referred to as touch) with the touchscreen by a user, where the touch may include use of a user's finger or a device such as a stylus. A touchscreen may include, but is not limited to, a capacitive touchscreen.

Electronic devices such as mobile devices are utilized for a wide range of operations. For certain of the operations a connection to an external display is beneficial because this may allow the use of a larger screen for certain operations in addition to or as alternative for a smaller integrated display.

In mobile devices, a touchscreen is widely used as an integrated display for devices such as a 2-in-1 computer (in which a keyboard portion of the computer may be folded to allow use of the computer as a tablet computer) or a detachable computer (in which a keyboard portion of the computer may be detached to allow use of the computer as a tablet computer), including, for example, computers utilizing an operating system such as Microsoft Windows 8®. However, external displays still retain the traditional non-touchscreen capability because of the high cost of producing a large sized touchscreen and because of other advantages provided by the external monitors.

External monitor modes such as extended screen mode (in which an external monitor is used a second display) and second screen only mode (in which an external monitor becomes the sole display for the computer) are popular in usage because of the advantages in adding the larger external monitor.

However, when a user is operating using an external monitor mode with a mobile device in a tablet mode (meaning a 2-in-1 or detachable computer that is operated in tablet mode or a dedicated tablet computer), the user may lose control of the extended display because the external monitor is not a touchscreen display. In this circumstance, the user is commonly required to connect an additional user interface device, such as a mouse, track pad, or other interface device, to the tablet in order to provide for control in operation with the external display, which can be an inconvenient operation for a user of the mobile device. In one example, a user who is utilizing the mobile device for a presentation may required to connect and use an additional user interface in order to control the presentation for the user's audience. A conventional touchscreen device will not operate as a user interface for the external monitor operation to report relative position to control operations using the external display, which the limits the usefulness of multi-display and external display operations.

In some embodiments, an electronic device provides for:

(1) A switchable input mode for a touchscreen allowing selection of either operation as a touchscreen (touchscreen mode) or operation as a user interface device for an external display (mouse mode). In some embodiments, after switching the physical touchscreen to mouse mode, the touchscreen is designated as mouse device and reports relative position for purposes of providing input for external monitor operation. In some embodiments, only one of the plurality of input modes is operable at any time, such as, for example, either the touchscreen mode or the mouse mode being enabled.

(2) The electronic device includes a hardware switch button or software button to switch modes and to provide an indicator of the current mode. In some embodiments, a hardware button with an LED (light emitting diode) indicator light is included to facilitate user's operation. In other embodiments, a software button is displayed as an icon on the touchscreen.

The electronic device may further include a hardware or software button to switch between setting for an input mode, such as switching between settings for right-handed and left-handed operation in mouse mode. For example, the behavior of an entry on the touchscreen may be equivalent to a mouse operation, with entries being made to positions that correspond to buttons of a mouse, such as the left and right button of the mouse.

FIG. 1 is an illustration of an embodiment of an electronic device to provide switchable input modes for external display operation. As illustrated in FIG. 1, an electronic device 100 such as a 2-in-1 computer, detachable computer, tablet computer, or other mobile device, includes a touchscreen 110 to both display data and provide user input functions. A front view of the electronic device 100 is provided in FIG. 1. The electronic device may be connected to an external monitor 160 via a cable 150 (a wired or optical cable) or a wireless connection 155, such as utilizing Bluetooth® or other short distance wireless service.

In some embodiments, the electronic device 100 include multiple input modes for operational control using the touchscreen 110, the input modes including a first touchscreen mode in which the touchscreen 110 operates in a conventional fashion to provide user input for the touchscreen display and a second mouse mode in which the touchscreen 110 operates as a mouse or touch pad to provide user input for the external monitor 160. In some embodiments, upon connecting the external monitor 160 as an extended monitor or as the active monitor in a second screen only operation, the electronic device 100 provides an indicator regarding a current mode, wherein the mode is either the touchscreen mode or the mouse mode, the electronic device 100 including a button to switch between the touchscreen mode and the mouse mode. In some embodiments, the electronic device 100 includes one or more additional switch buttons to switch between settings for the mouse mode, where the settings may include a right-handed mouse setting and a left-handed mouse setting.

In some embodiments, the electronic device 100 includes a first hardware button 120 to switch between the touchscreen mode and the mouse mode. In some embodiments, the first hardware button 120 also acts as a first indicator to show the current input mode, such as an indicator light of the button 120 being a first color (yellow, for example) when the electronic device is in the touchscreen mode and a second color (green, for example) when the electronic device is in the mouse mode. In some embodiments, the indicator light of button 120 may be turned off, darkened (which may appear gray, for example), or in third color (red, for example) when the mouse mode is not available, including a circumstance in which the external monitor 160 is not connected or the external monitor 160 is connected in a different second monitor operation mode, such as a PC (local) screen only mode or a duplicate monitor mode. The indicator light may be an LED or other indicator. In some embodiments, the button 120 is located in a bezel portion of the cover around the touchscreen 110 of the electronic device 100.

In some embodiments, the electronic device 100 includes one or more additional hardware buttons (such as a second button 125 and a third button 126) to switch between settings for the mouse mode, wherein the settings may include a first right-handed mouse setting and a second left-handed mouse setting, the settings determining whether the mouse mode is to emulate a mouse that is set for right-handed use or left-handed use. In some embodiments, the button or buttons 125-126 also act as a second indicator, such as the buttons being lit in a certain color (such as green) when the mouse mode is chosen, thus indicating that the selection of mouse settings is available.

Figure 2:
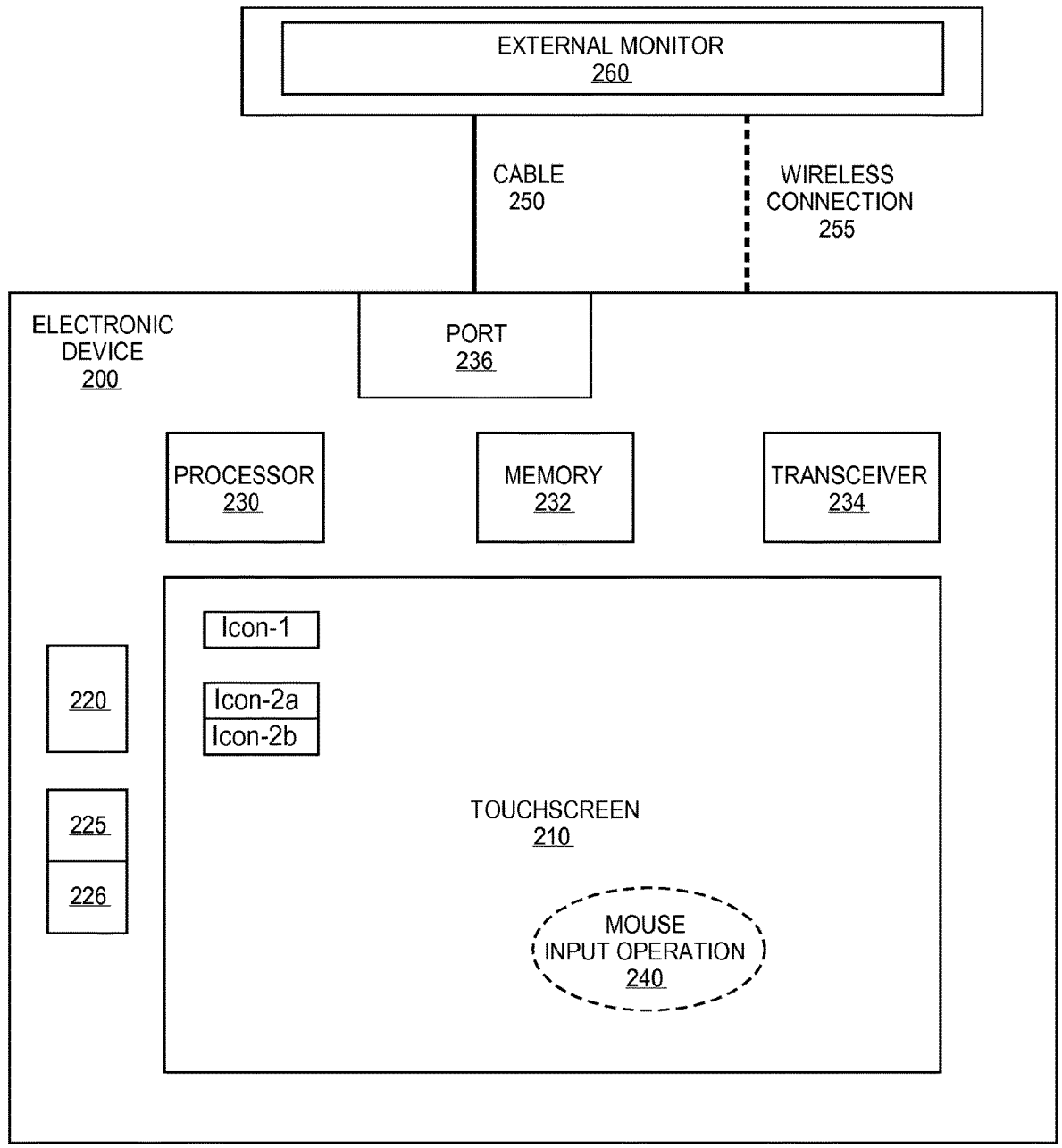
FIG. 2 an illustration of an embodiment of an electronic device to provide switchable input modes for external display operation.

FIG. 2 an illustration of an embodiment of an electronic device to provide switchable input modes for external display operation. As illustrated in FIG. 2, an electronic device 200 such as a 2-in-1 computer, detachable computer, tablet computer, or other mobile device, includes a touchscreen 210 to both display data and provide user input functions. The electronic device may be connected to an external monitor 260 via a cable 250 (a wired or optical cable) or a wireless connection 255, such as utilizing Bluetooth® or other short distance wireless service.

In some embodiments, the electronic device includes a touchscreen 210. In some embodiments, the electronic device may include a first hardware button 220 and first indicator (which may be incorporated into the first button) to switch between input modes, such as between a touchscreen mode and a mouse mode, and to indicate a current input mode; and one or more hardware buttons such as a second hardware button 225 and a third hardware button 226 and a second indicator (which may be incorporated into the second and third switch buttons) to switch between mouse settings and to indicate a current mouse setting (enabling the mouse input operation 240 on the touchscreen 210). In some alternative embodiments, the electronic device may instead use one or more soft keys indicated by icons on the touchscreen 210, such as a first software button Icon-1 to switch between input modes and indicate a current input mode, and one or more software buttons, such as Icon-2a and Icon-2b to select input mode settings and to indicate a current setting. As used herein, a switch button may be either a hardware button or a software button on a display.

In some embodiments, the electronic device 200 further includes a processor 230 to process data, a memory 232 to store certain data, and a transceiver 234 to transmit and receive data. In some embodiments, the electronic device 200 may includes a port 236 to connect with the external monitor 260 via the cable 250. In some embodiments, the electronic device 200 may be operable to connect with the external monitor via a wireless connection 255 utilizing transceiver 234.

In an electronic 2-in-1 or detachable design device, when in a touchscreen input mode, a user will generally lose control for the external monitor extended display unless an external input device such as a mouse is connected. In some embodiments, the electronic device is operable to provide a mouse input mode for control using the external monitor 260. In some embodiments, the processor 230 will operate to detect the connection of the external monitor 260 to the electronic device and to place the electronic device in an initial input mode, where the initial input mode may be the touchscreen mode. In some embodiments, the processor 230 operates to activate the first indicator, such as enabling an LED indicator light to provide a visualized button, to indicate a switchable status, and enables a selection between a touchscreen mode and a mouse mode. In some embodiments, upon the electronic device detecting the selection of the mouse mode, the processor is to activate the second indicator indicating a mouse setting status.

In an example, an electronic device may provide the following mode operations shown in Table 1:

TABLE 1

| Mode | Switch Button | Setting Button(s) |
|---|---|---|
| Touchscreen Only | Off (Disabled-Hidden) | Off (Disabled-Hidden) |
| Touchscreen Mode | Yellow (Enabled-Inactive) | Off (Disabled-Hidden) |
| Mouse Mode | Green (Enabled-Active) | Green (Enabled) |

As provided in Table 1, "Disabled" indicates that the relevant button is currently disabled; "Enabled" means the relevant button is currently enabled; "Inactive" means the mouse mode is currently inactive; "Active" means that the mouse mode is currently active; and "Hidden" means that the relevant button is hidden by turning off or dimming the indicator for a hardware button or dimming or removing a soft button.

Figure 3:
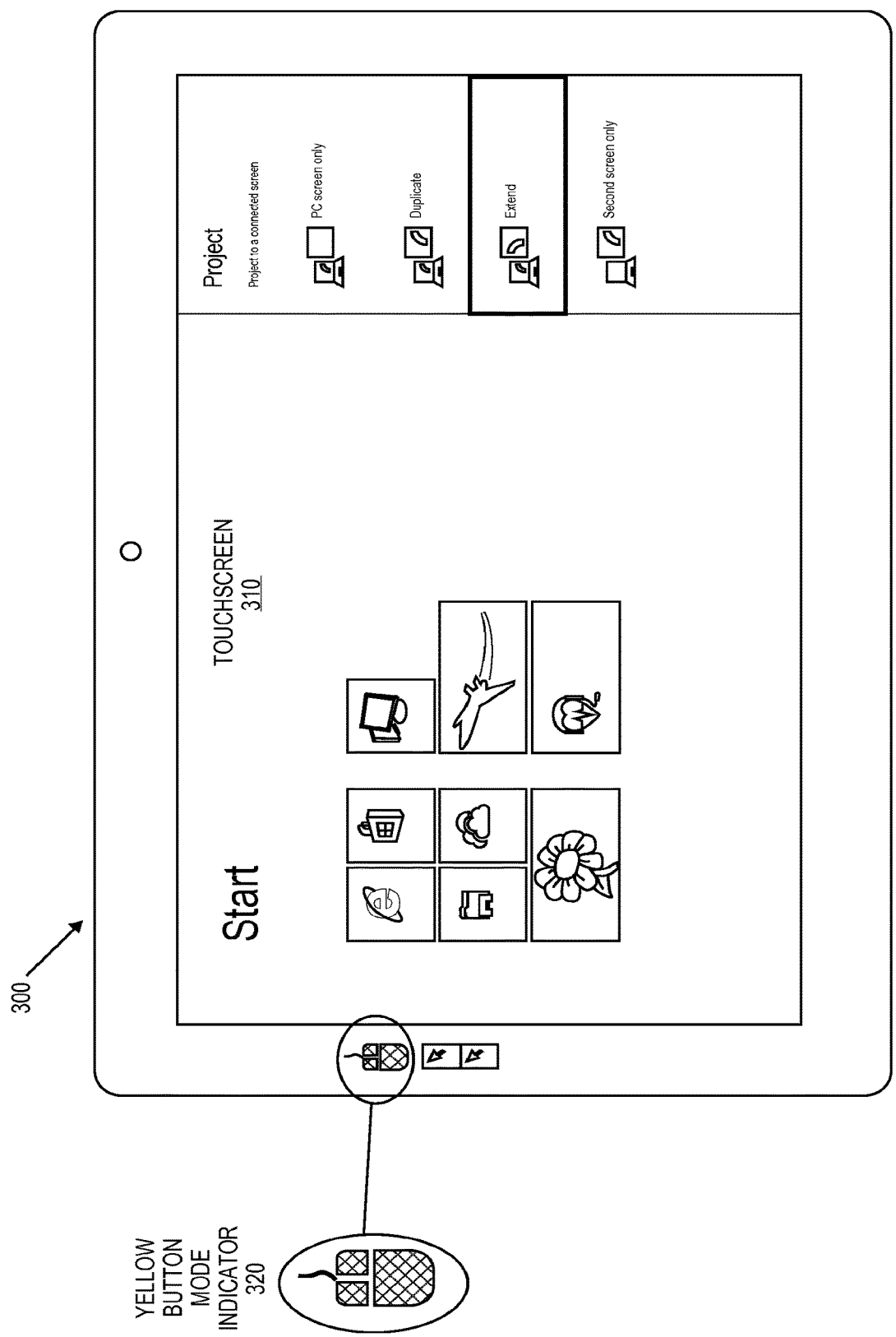
FIG. 3 is an illustration of an embodiment of an electronic device in a touchscreen mode.

FIG. 3 is an illustration of an embodiment of an electronic device in a touchscreen mode, the touchscreen mode being a first input mode. As illustrated in FIG. 3, an electronic device 300 with touchscreen display 310 includes an input mode indicator in a first state, shown as the mouse button including a yellow mode indicator 320. The electronic device may be a computer operating in a tablet mode. As provided in the example shown in Table 1, the yellow button indicator is an indication that the input switchable state is enabled for a connected external monitor (with the external monitor not illustrated in FIG. 3) with the current input mode being the touchscreen mode (and thus the mouse mode is inactive). In this example, the touchscreen reports an absolute position on the touchscreen for the touchscreen mode.

Figure 4:
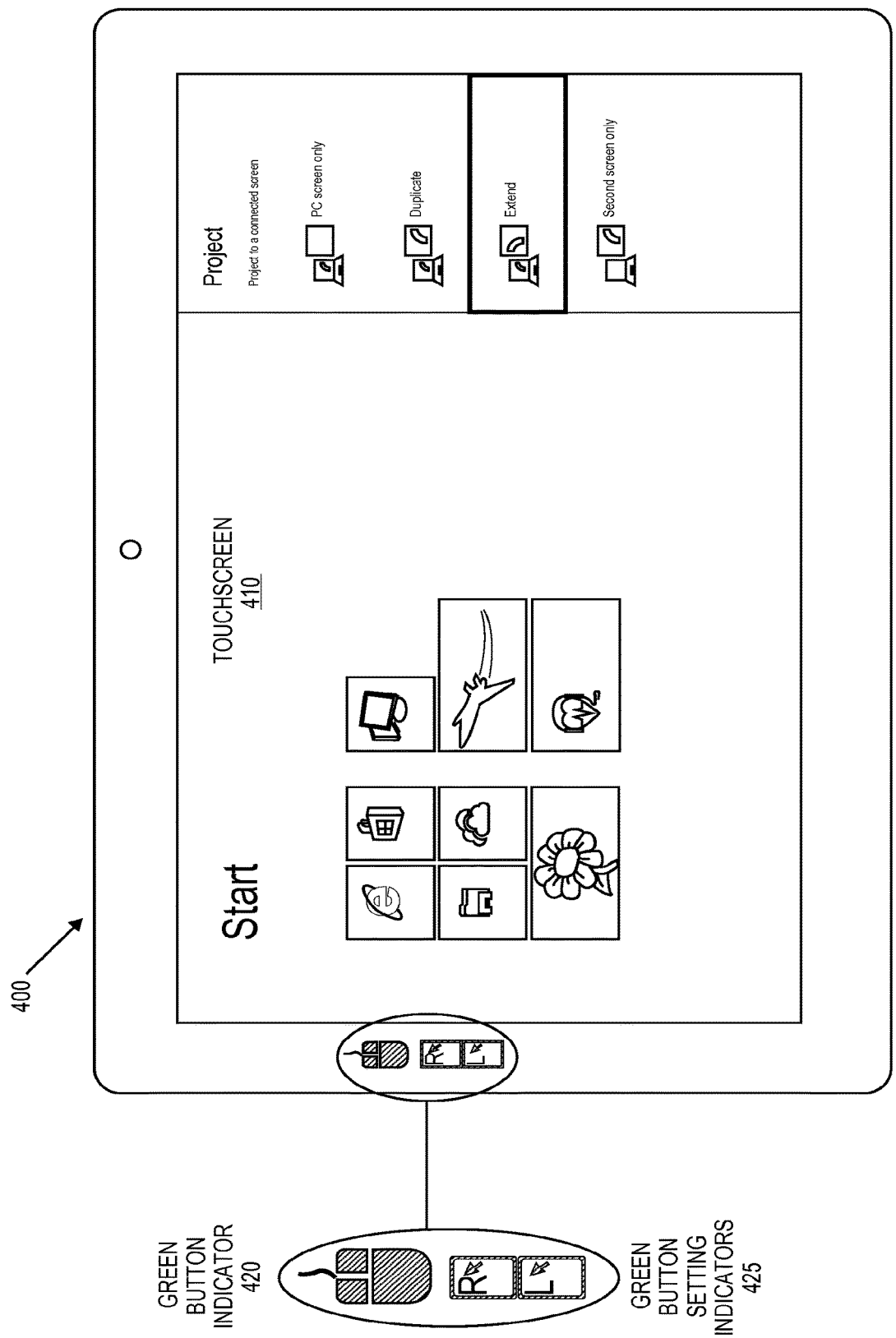
FIG. 4 is an illustration of an embodiment of an electronic device in a mouse mode.

FIG. 4 is an illustration of an embodiment of an electronic device in a mouse mode, the mouse mode being a second input mode. As illustrated in FIG. 4, an electronic device 400 with touchscreen display 410 includes an input mode indicator in a second state, shown as the mouse button including a green mode indicator 420. As provided in the example shown in Table 1, the green button indicator 420 is an indication that the input switchable state is enabled for an external monitor (not illustrated in FIG. 4) with the current input mode being the mouse mode (and thus the mouse mode is active). In this example, the touchscreen reports a relative position on the touchscreen, and an external input device is not required to provide control for the external monitor.

In some embodiments, the electronic device includes addition button setting indicators 425 to enable selection of a setting for the input device, in this case being a right-handed or left-handed button select for the mouse setting. As provided in Table 1, the green indicator indicates that the state for selection of a setting for the input device (mouse) setting is enabled. As illustrated, after switching to mouse mode, two additional buttons are made visible (such as two additional hardware buttons being illuminated in the bezel of the cover of the electronic device 400), the buttons being operable to control the mouse mode as working as a right-handed mouse device or a left-handed mouse device. In mouse mode, the touchscreen will be listed as a mouse device and report relative position for cursor movement.

Figure 5:
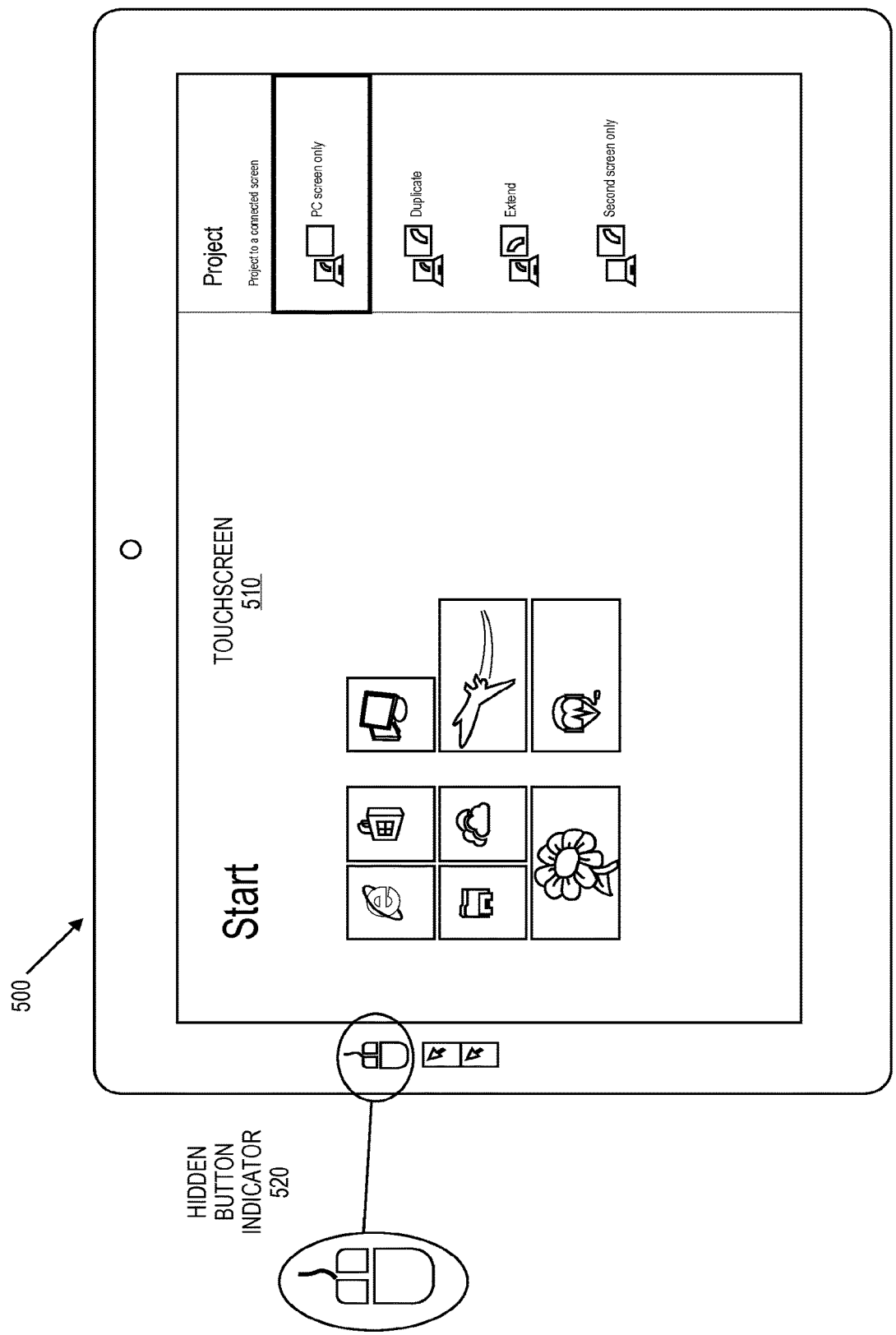
FIG. 5 is an illustration of an embodiment of an electronic device in a touchscreen only mode.

FIG. 5 is an illustration of an embodiment of an electronic device in a touchscreen only mode, the touchscreen only mode being a third input mode. As illustrated in FIG. 5, an electronic device 500 with touchscreen display 510 includes an input mode indicator 520 that is disabled. As provided in the example shown in Table 1, the hidden button indicator is an indication that the input switchable state is disabled, such as for a connected external monitor (with the external monitor not illustrated in FIG. 5) in a local screen only (PC screen) mode or a duplicate monitor mode. In some embodiments, the touchscreen only mode is the default mode for the electronic device 500, and the mouse mode cannot be selected or used. In some embodiments, a selection button is disabled and hidden, such as by disabling and dimming a hardware button.

Figure 6:
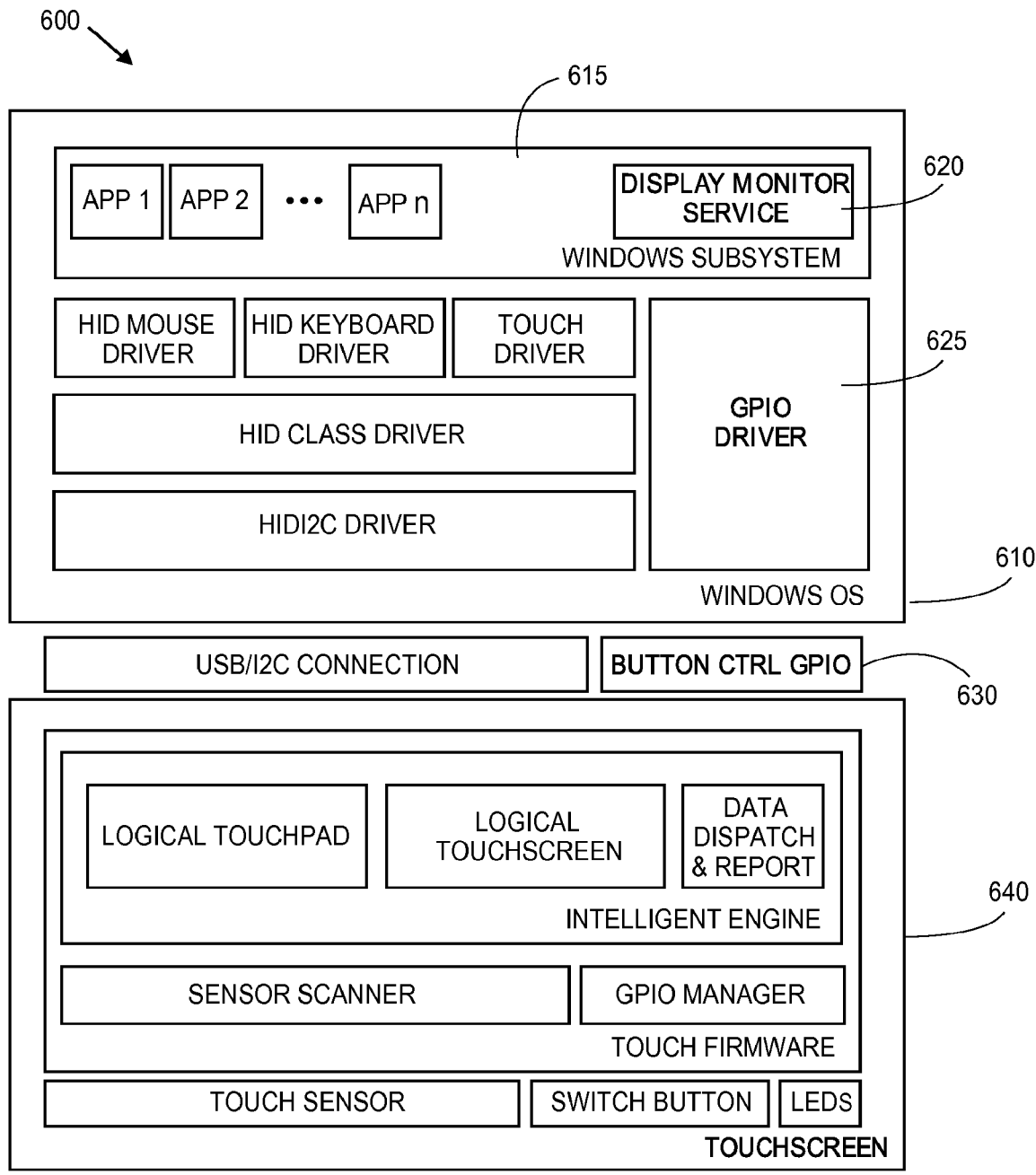
FIG. 6 is an illustration of a software stack in an embodiment of an electronic device.

FIG. 6 is an illustration of a software stack in an embodiment of an electronic device. In some embodiments, in order to implement switchable input modes (touchscreen and mouse modes), in addition to a potential hardware modification, an electronic device includes BIOS (Basic Input Output System) and software stack modifications. In some embodiments, an architecture of an embodiment of an electronic device includes:

(1) An OS 610 (Operating System—Microsoft Windows®, in this illustration) includes subsystem 615 (Windows subsystem in this illustration), which in some embodiments includes a display monitor service 620. In some embodiments, the operating system 610 further includes a GPIO (General Purpose input/output) driver 625, where GPIO generally refers to a generic pin with a behavior that can be controlled at run time.

(2) A button control GPIO 630, as driven by GPIO driver 625.

(3) A touchscreen module 640, the touchscreen module including:

(a) Touch firmware, the firmware including an intelligent engine including logical touchpad, logical touchscreen, and data dispatch and report; a sensor scanner; and a GPIO manager; and (b) Touch sensor, switch button(s), and LEDs (or other indicators).

Figure 7:
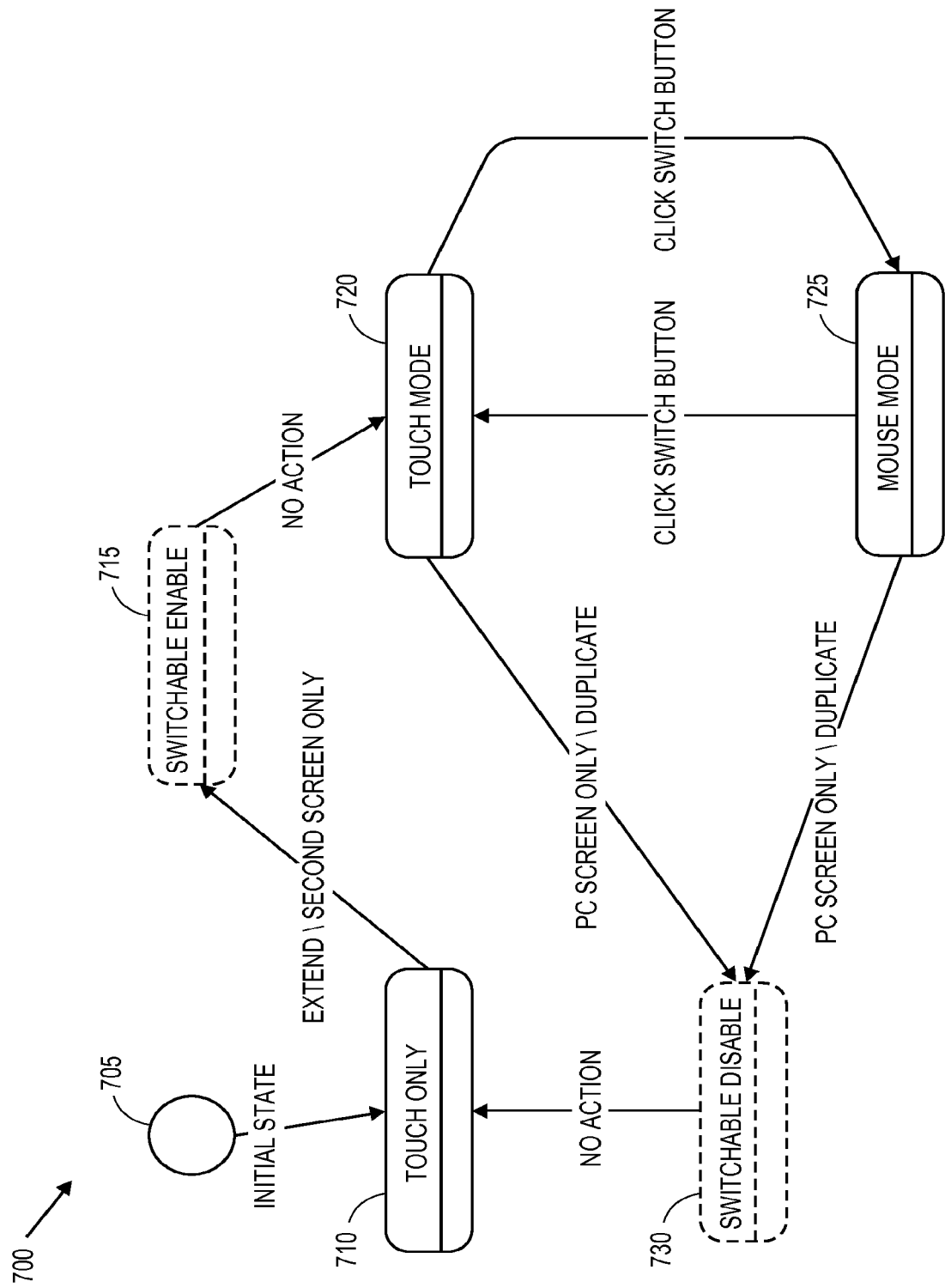
FIG. 7 is a state diagram to illustrate operation of an electronic device according to an embodiment.

FIG. 7 is a state diagram to illustrate operation of an electronic device according to an embodiment. As illustrated in FIG. 7, from an initial state 705 the device may enter a touchscreen only state, touch only 710, which may be a default input mode. In some embodiments, upon entering an extended screen or second screen only mode for an connected external monitor, the state becomes a switchable input enabled state 715, which then defaults to a touch mode 720, in which a touchscreen operates in a touchscreen mode.

In some embodiments, the mode may switch between the touch mode 720 and a mouse mode 725, whereby the touchscreen acts as a mouse or track pad device for the external monitor, upon receiving a click entry on the switch button.

In some embodiments, the state may change to a switchable input disabled mode 730 upon entering a PC screen only or duplicate mode, and then return to the touch only state 710.

Figure 8:
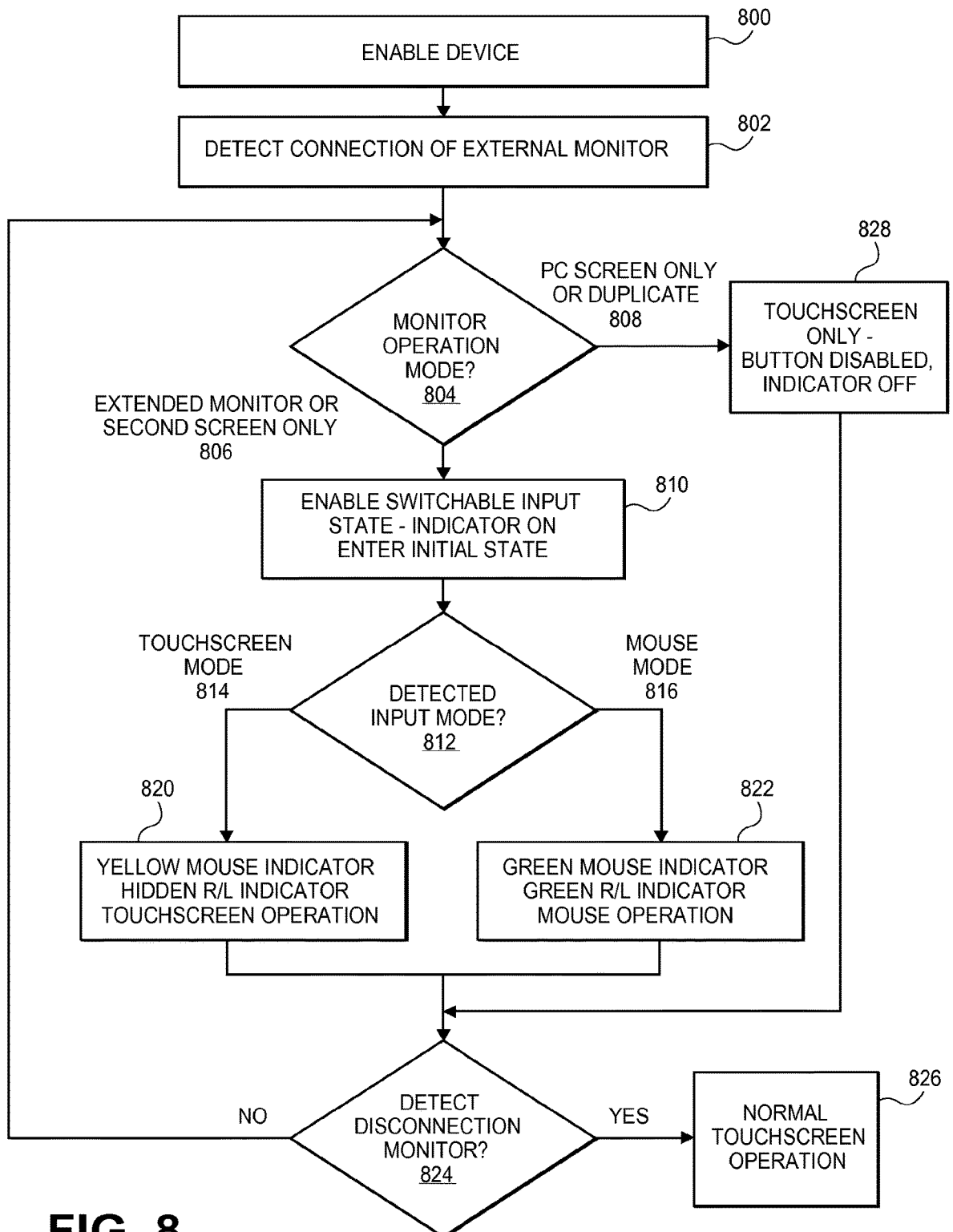
FIG. 8 is a flow chart to illustrate an embodiment of a process for switchable input in an electronic device.

FIG. 8 is a flow chart to illustrate an embodiment of a process for switchable input in an electronic device. In some embodiments, upon enablement of a electronic device 800 and the detection by the electronic device of a connection of an external monitor 802, if a monitor operation mode 804 is a device screen only (PC screen only) or duplicate screen mode 808, then the device will remain in a touchscreen only mode 828, which may be a default input mode. In some embodiments, a button to switch between input modes is disabled and an indicator for such button is hidden or off. In some embodiments, one or more additional buttons for an input device setting (such as a mouse setting) are disabled, and indicators for such one or more buttons are off or hidden.

In some embodiments, if the monitor operation mode 804 is an extended screen mode or second screen only mode 806, then the device will enter a switchable state, and turn on the indicator for the switchable input state 810. In some embodiments, the device may enter an initial state, and in some embodiments the initial state is a touchscreen mode.

In some embodiments, a detected input mode 812 may be determined by the state of a switch button. If the switch input indicates the touchscreen is to be placed in the touchscreen mode 814 (which may be the initial default mode), then the device will provide a touchscreen mode indicator (such as providing a yellow mouse indicator and hiding a Right/Left setting for a mouse) and activate touchscreen operation 820. If the switch input indicates a mouse mode 816, then the device will provide a mouse mode indicator (such as providing a green mouse indicator and green Right/Left setting for the mouse mode) and activate mouse operation by the touchscreen 822.

In some embodiments, if a disconnection of the external monitor is detected 824, the device may return to normal touch screen operation 826. Otherwise, the device may return to providing operations based on the current monitor operation mode 804.

Figure 9:
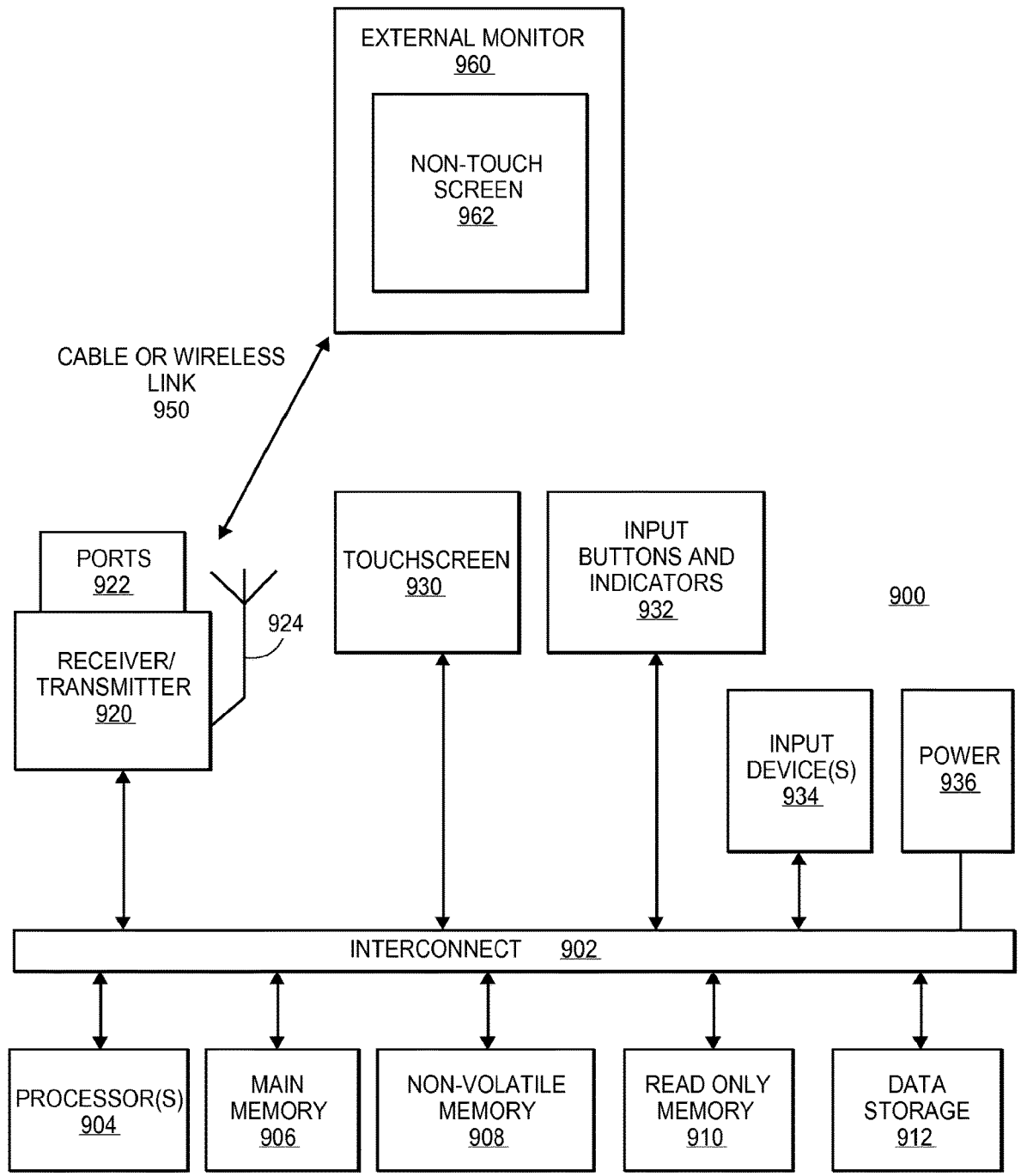
FIG. 9 illustrates an apparatus or system to provide switchable input modes for external display operation.

FIG. 9 illustrates an apparatus or system to provide switchable input modes for external display operation. In this illustration, certain standard and well-known components that are not germane to the present description are not shown. Elements shown as separate elements may be combined, including, for example, an SoC (System on Chip) combining multiple elements on a single chip. The apparatus or system may include, but is not limited to, a mobile device.

Under some embodiments, the apparatus or system 900 (referred to generally herein as an apparatus) includes an interconnect 902 or other communication means for transmission of data. The interconnect 902 is illustrated as a single interconnect for simplicity, but may represent multiple different interconnects or buses and the component connections to such interconnects may vary. The interconnect 902 shown in FIG. 9 is an abstraction that represents any one or more separate physical buses, point-to-point connections, or both connected by appropriate bridges, adapters, or controllers.

In some embodiments, the apparatus 900 includes one or more transmitters or receivers 920 coupled to the interconnect 902. In some embodiments, the apparatus 900 may include one or more antennae 924 (such as dipole or monopole antennae) for the transmission and reception of data via wireless communication. In some embodiments, the apparatus 900 includes one or more ports 922 for the transmission and reception of data via cable communications. In some embodiments, the apparatus 900 is operable to connect with an external monitor 960, shown as including a non-touch screen 962, via a cable or wireless link 950.

In some embodiments, the apparatus 900 further includes a touchscreen 930 and one or more switch buttons and indicators 932 for touchscreen and mouse mode operation. In some embodiments, the apparatus 900 operates the touchscreen in a touch only mode if the external monitor 960 is not connected or the apparatus 900 is in a local screen only or duplicate screen mode. In some embodiments, the apparatus 900 operates the touchscreen 930 in a switchable input state if the apparatus 900 is in a first monitor operation mode that is either an extended screen mode or an external screen only mode, wherein the apparatus 900 is switchable between a touch mode (using the touchscreen as a touch input device for the touchscreen) and a mouse mode (using the touchscreen as a mouse or track pad for the external monitor 960). In some embodiments, the apparatus 900 may be switched between input modes using a first switch button and may be switched between input mode settings using one or more additional switch buttons 932. In some embodiments, the switch buttons 932 are hardware buttons, such as buttons installed in a bezel portion of a cover of the apparatus, and the apparatus 900 may enable the switch buttons when the apparatus 900 is in the corresponding state. In some embodiments, the indicators 932 are portions of the switch buttons, such as LED lights, or separate indicators, and the apparatus may activate the indicators when the apparatus is in the corresponding state. In alternative embodiments, the switch buttons may be implemented as software buttons.

The apparatus 900 may include a processing means such as the one or more processors 904 coupled to the interconnect 902 for processing information. The processors 904 may comprise one or more physical processors and one or more logical processors. In some embodiments, the processors 904 may include a general-purpose processor. In some embodiments, functions of the processors 904 include the processing the input states of the apparatus 900, including enabling and disabling switch buttons, activating or deactivating indicators, and responding to inputs on the touchscreen according to a current input state.

In some embodiments, the apparatus 900 further comprises a random access memory (RAM) or other dynamic storage device or element as a main memory 906 for storing information and instructions to be executed by the processors 904. The apparatus 900 may include one or more non-volatile memory elements 908, including, for example, flash memory, for the storage of certain elements. The apparatus 900 also may comprise a read only memory (ROM) 910 or other static storage device for storing static information and instructions for the processors 904, and data storage 912, such as a solid state drive, for the storage of data.

In some embodiments, the apparatus 900 includes one or more additional input devices 934 for the input of data, including hard and soft buttons, a joystick, a mouse or other pointing device, voice command system, or gesture recognition system.

The apparatus 900 may also comprise a battery or other power source 936, which may include a solar cell, a fuel cell, a charged capacitor, near field inductive coupling, or other system or device for providing or generating power in the apparatus 900. The power provided by the power source 936 may be distributed as required to elements of the apparatus 900.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, compact disk read-only memory (CD-ROM), and magneto-optical disks, read-only memory (ROM), random access memory (RAM), erasable programmable read-only memory (EPROM), electrically-erasable programmable read-only memory (EEPROM), magnet or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

In some embodiments, electronic device includes: a touchscreen display; a processor; a connection for an external monitor; and a switch button. The electronic device includes a switchable input state including a first input mode for which the touchscreen display operates as a touchscreen input and a second input mode for which the touchscreen display operates as an input device for the operation of the external monitor; and the processor is to change operation of the electronic device to the first input mode or to the second input mode based upon a selection of input mode received at the switch button.

In some embodiments, the electronic device further includes an indicator to indicate a current input mode.

In some embodiments, the indicator is a portion of the switch button.

In some embodiments, the electronic device includes a third input mode for touchscreen only operation. In some embodiments, the switchable input state is disabled in the third input mode. In some embodiments, the indicator is hidden in the third input mode.

In some embodiments, the switch button is a hardware button. In some embodiments, the switch button is a software button provided on the touchscreen.

In some embodiments, the electronic device further includes one or more additional switch buttons to set a setting for the second input mode.

In some embodiments, the touchscreen acts as a mouse or track pad for the second input mode.

In some embodiments, the electronic device is a device operating as a tablet computer.

In some embodiments, the first monitor operation mode is one of an extended screen mode or a second screen only mode. In some embodiments, the second monitor operation mode is one of a local screen only mode or a duplicate monitor mode.

In some embodiments, a method includes: detecting the connection of an external monitor with an electronic device, the electronic device including a touchscreen; determining a monitor operation mode; and for a first monitor operation mode: enabling a switchable input state for the electronic device and turning on an indicator, and switching between a plurality of input modes based on a detected input at a switch button, the input modes including a first input mode in which the touchscreen operates as a touchscreen input and a second input mode in which the touchscreen operates as an input device for the operation of the external monitor.

In some embodiments, the method further includes enabling an indicator to indicate a current input mode.

In some embodiments, the method further includes, for a second monitor operation mode, entering a third input mode, wherein the switchable input state is disabled in the third input mode. In some embodiments, the method further includes turning off the indicator in the third input mode.

In some embodiments, the method further includes implementing a setting for the second input mode based on detection of an input at one or more additional switch buttons.

In some embodiments, the touchscreen acts as a mouse or track pad in the second input mode.

In some embodiments, the first monitor operation mode is one of an extended screen mode or a second screen only mode. In some embodiments, the second monitor operation mode is one of a local screen only mode or a duplicate monitor mode.

In some embodiments, a system includes: a cover; a touchscreen display; a processor; a connection for an external monitor; and a first hardware switch button in the cover, the first switch button including an indicator light to indicate a current input mode. The electronic device includes a switchable input state including a first input mode for which the touchscreen display operates as a touchscreen input and a second input mode for which the touchscreen display operates as an input device for the operation of the external monitor; and the processor is to change operation of the electronic device to the first input mode or to the second input mode based upon a selection of input mode received at the first switch button.

In some embodiments, the indicator light is a first color for the first input mode and a second color for the second input mode.

In some embodiments, the electronic device includes a third input mode for touchscreen only operation, wherein the switchable input state is disabled in the third input mode and wherein the indicator is turned off in the third input mode.

In some embodiments, the first switch button is located in a bezel portion of the cover around the touchscreen.

In some embodiments, the system further includes one or more additional hardware switch buttons to set a setting for the second input mode.

In some embodiments, a non-transitory computer-readable storage medium having stored thereon data representing sequences of instructions that, when executed by a processor, cause the processor to perform operations including: detecting the connection of an external monitor with an electronic device, the electronic device including a touchscreen; determining a monitor operation mode; and for a first monitor operation mode: enabling a switchable input state for the electronic device and turning on an indicator, switching between a plurality of input modes based on a detected input at a switch button, the input modes including a first input mode in which the touchscreen operates as a touchscreen and a second input mode in which the touchscreen operates as an input device for the external monitor, and indicating a current input mode with an indicator.

In some embodiments, the storage medium further includes instructions for, for a second monitor operation mode, entering a third input mode, wherein the switchable input state is disabled in the third input mode, and turning off the indicator.

In some embodiments, the storage medium further includes instructions for implementing a setting for the second input mode based on detection of an input at one or more additional switch buttons.

In some embodiments, an apparatus includes: a means for detecting the connection of an external monitor with an electronic device, the electronic device including a touchscreen; a means for determining a monitor operation mode; and for a first monitor operation mode: a means for enabling a switchable input state for the electronic device and turning on an indicator, a means for switching between a plurality of input modes based on a detected input at a switch button, the input modes including a first input mode in which the touchscreen operates as a touchscreen and a second input mode in which the touchscreen operates as an input device for the external monitor, and a means for indicating a current input mode with an indicator.

In some embodiments, the apparatus further includes, for a second monitor operation mode, a means for entering a third input mode, wherein the switchable input state is disabled in the third input mode, and a means for turning off the indicator.

In some embodiments, the apparatus further includes a means for implementing a setting for the second input mode based on detection of an input at one or more additional switch buttons.

What is claimed is:

1. A mobile device comprising:
    a touchscreen;
    at least one processor;
    a transmitter to transmit information to an external display; and
    one or more memories including instructions which, when executed, cause the at least one processor to at least, upon display of a user interface at the external display:
        operate in a first input mode in which the touchscreen is to operate as a touchscreen input for only the mobile device during presentation of the user interface at the external display;
        detect a user input received from the touchscreen, the user input corresponding to a selection to operate in a second input mode; and
        in response to detection of the user input, operate in the second input mode in which the touchscreen is to operate as a touchpad for interaction with the user interface presented at the external display, and present an indicator to convey an indication that the second input mode is in use, wherein the indicator to convey the indication is used to switch operation between the first input mode and the second input mode.

2. The mobile device of claim 1, wherein the transmitter is to transmit the information via a port.

3. The mobile device of claim 2, wherein the port supports a wired connection.

4. The mobile device of claim 1, wherein the instructions, when executed, further cause the at least one processor to, upon detection of a connection to the external display, operate in the first input mode.

5. The mobile device of claim 1, wherein the instructions, when executed, further cause the at least one processor to, upon detection of a disconnection from the external display, operate in the first input mode.

6. The mobile device of claim 1, further including a battery.

7. The mobile device of claim 1, wherein the user interface presented at the external display is a first user interface and, in the second input mode, the touchscreen is not to operate as a user input for interaction with a second user interface presented at the touchscreen.

8. The mobile device of claim 1, wherein the external display is not a touchscreen display.

9. The mobile device of claim 1, wherein, during operation in the first input mode, the touchscreen does not allow interaction with the user interface presented at the external display.

10. At least one non-transitory computer readable medium comprising instructions which, when executed, cause at least one processor of a mobile device to at least:

operate in a first input mode in which a touchscreen is to exclusively function as a touchscreen input for controlling a first interface of the mobile device during presentation of a second interface at an external display;

in response to detection of a user input received from the touchscreen, the user input corresponding to a selection to operate in a second input mode, operate in the second input mode in which the touchscreen is to operate as a touchpad for interaction with a user interface presented by the external display; and present an indicator to convey an indication that the second input mode is in use, wherein the indicator to convey the indication is used to switch operation between the first input mode and the second input mode.

11. The at least one computer readable medium of claim 10, wherein the instructions, when executed, further cause the at least one processor to, upon detection of a connection to the external display, operate in the first input mode.

12. The at least one computer readable medium of claim 10, wherein the instructions, when executed, further cause the at least one processor to, upon detection of a disconnection from the external display, operate in the first input mode.

13. The at least one computer readable medium of claim 10, wherein the external display is not a touchscreen display.

14. A method to facilitate interaction with an external display connected to a mobile device, the method comprising:

operating the mobile device in a first input mode in which a touchscreen of the mobile device is to function exclusively as a touchscreen input for controlling a first interface of the mobile device during presentation of a second interface via an external display;

in response to a user input from the touchscreen corresponding to a selection to operate in a second input mode, operating the mobile device in the second input mode in which the touchscreen is to operate as a touchpad for interaction with a user interface presented at the external display; and presenting an indicator to convey an indication that the second input mode is in use, wherein the indicator to convey the indication is used to switch operation between the first input mode and the second input mode.

15. The method of claim 14, further including upon detection of a connection to the external display, operating in the first input mode.

16. The method of claim 14, further including upon detection of a dis-connection to the external display, operating in the first input mode.

17. The method of claim 14, wherein, in the second input mode, the touchscreen is not to operate as a user input for interaction with a second user interface presented at the touchscreen.

18. The method of claim 14, wherein the external display is not a touchscreen display.

19. An apparatus comprising:

a touchscreen;

means for detecting a user input received via the touchscreen, the user input corresponding to a selection to operate in a first input mode or a second input mode;

means, responsive to the user input selecting the first input mode, for operating in the first input mode in which the touchscreen is only to function as a touchscreen input for controlling a first interface of the apparatus during presentation of a second user interface at an external monitor, in response to the user input selecting the second input mode, the means for operating to operate in the second input mode, in which the touchscreen is to operate as a touchpad for interaction with a user interface presented at the external monitor; and means for presenting an indication that the second input mode is in use, wherein the means for presenting an indication is used as an input for the means for operating to switch the operation between the first input mode and the second input mode.

20. The apparatus of claim 19, wherein the means for detecting is a first means for detecting, and further including second means for detecting a connection of the apparatus to the external monitor, the apparatus to operate in the first input mode in response to the detection of the connection to the external monitor.

21. The apparatus of claim 19, wherein the means for detecting is a first means for detecting, and further including second means for detecting a dis-connection of the apparatus from the external monitor, the means for operating to operate in the first input mode in response to the detection of the disconnection of the apparatus from the external monitor.

22. The apparatus of claim 19, wherein, in the second input mode, the touchscreen is not to operate as a user input for interaction with the first interface.

23. The apparatus of claim 19, wherein the external monitor is not a touchscreen display.

24. The apparatus of claim 19, further including means for transmitting display information to the external monitor via a port.

25. The apparatus of claim 24, wherein the port supports a wired connection.

26. The apparatus of claim 19, further including a battery.

* * * * *